US006250275B1

(12) United States Patent
Bock et al.

(10) Patent No.: US 6,250,275 B1
(45) Date of Patent: Jun. 26, 2001

(54) INTERNAL COMBUSTION ENGINE PISTON PIN LUBRICATION

(75) Inventors: Allyn P. Bock, West Lafayette; Brian K. Kruse, Lafayette, both of IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/375,320

(22) Filed: Aug. 16, 1999

(51) Int. Cl.[7] .......... F16J 1/08
(52) U.S. Cl. .......... 123/196 R
(58) Field of Search .......... 123/41.35, 41.42, 123/41.79, 196 R, 196 M; 92/186; 184/6.5, 6.8, 11.2

(56) References Cited

U.S. PATENT DOCUMENTS

| | | | | |
|---|---|---|---|---|
| 4,010,718 | | 3/1977 | Stewart | 123/41.35 |
| 4,067,307 | | 1/1978 | Hofle et al. | 123/41.35 |
| 4,129,108 | | 12/1978 | Elsbett et al. | 123/193 P |
| 4,142,484 | | 3/1979 | Buhl | 123/41.35 |
| 4,206,726 | | 6/1980 | Johnson, Jr. et al. | 123/41.35 |
| 4,286,505 | | 9/1981 | Amdall | 92/186 |
| 4,359,973 | | 11/1982 | Shimada . | |
| 4,377,967 | | 3/1983 | Pelizzoni | 92/186 |
| 4,506,632 | | 3/1985 | Kanda et al. . | |
| 4,508,065 | | 4/1985 | Suchdev | 123/41.35 |
| 4,577,595 | | 3/1986 | Deutschmann et al. | 123/41.35 |
| 4,587,932 | | 5/1986 | Moebus | 123/41.35 |
| 4,640,236 | | 2/1987 | Nakano et al. | 123/41.79 |
| 4,667,630 | | 5/1987 | Sasaki | 123/254 |
| 4,715,335 | | 12/1987 | Elsbett et al. | 123/41.35 |
| 4,831,979 | * | 5/1989 | DuBois et al. | 123/196 M |
| 4,867,119 | | 9/1989 | Cooper et al. | 123/193 P |
| 4,869,211 | | 9/1989 | Heberle et al. | 123/41.35 |
| 5,065,706 | | 11/1991 | Zvonkovic | 123/41.35 |
| 5,065,707 | | 11/1991 | Elsbett et al. | 123/41.42 |
| 5,081,959 | | 1/1992 | Akiyama | 123/41.35 |
| 5,503,116 | | 4/1996 | Wolf | 123/41.35 |
| 5,533,472 | | 7/1996 | Sands et al. | 123/41.35 |
| 5,595,145 | | 1/1997 | Ozawa | 123/41.35 |
| 5,649,505 | | 7/1997 | Tussing | 123/41.35 |
| 5,730,090 | | 3/1998 | Kling et al. | 123/41.35 |
| 5,806,631 | * | 9/1998 | Yoshida et al. | 123/196 R |

FOREIGN PATENT DOCUMENTS

| | | | | |
|---|---|---|---|---|
| 1 576 387 | | 3/1970 | (DE) . | |
| 36 00 750 | * | 7/1987 | (DE) | 123/41.35 |
| 40 07 992 | | 9/1990 | (DE) . | |
| 196 47 735 | | 2/1998 | (DE) . | |

* cited by examiner

*Primary Examiner*—Willis R. Wolfe
*Assistant Examiner*—Hyder Ali
(74) *Attorney, Agent, or Firm*—Todd T. Taylor

(57) ABSTRACT

An internal combustion engine comprises a housing including a combustion cylinder, a piston including a piston skirt reciprocally disposed within the combustion cylinder and having a piston pin, the piston skirt defining a bottom surface and having a lubrication passage therein, the lubrication passage having an inlet in the bottom surface of the piston skirt and an outlet adjacent the piston pin, a connecting rod including an eye pivotally disposed about the piston pin, the eye having a lubrication bore oriented to provide at least intermittent fluid communication between the piston pin and the outlet of the lubrication passage, and a lubrication applicator adapted to apply lubricant to the inlet of the lubrication passage.

19 Claims, 2 Drawing Sheets

INTERNAL COMBUSTION ENGINE PISTON PIN LUBRICATION

TECHNICAL FIELD

The present invention relates to lubrication of reciprocating piston internal combustion engines, and, more particularly, to piston pin lubrication within such engines.

BACKGROUND ART

Reciprocating piston internal combustion engines include one or more pistons that are reciprocally disposed within corresponding combustion cylinders. The pistons are interconnected with each other through the use of a rotatable crankshaft. Rotation of the crankshaft causes each piston to reciprocate within its corresponding combustion cylinder. Typically, each piston is pivotally connected to one end of a connecting rod. The connecting rod includes an eye defining an eye bearing that receives a piston pin of the piston such that the connecting rod pivots through a relatively small pivoting angle about the piston pin during reciprocation. The other end of the connecting rod is also pivotally coupled to the crankshaft which also pivots through a relatively small angle. Lubrication of the moving and pivoting parts within an internal combustion engine is essential during operation, as the lubricant eases friction between moving/pivoting parts and aids in the removal of heat. The lubricant generally used is oil. One area where it is desired to provide lubrication in the internal combustion engine is the piston pin of a piston.

It is known to indirectly supply a lubricant such as oil to the piston pin by splashing the oil proximate the piston pin area. In one form, oil that is sprayed onto the piston undercrown area specifically for cooling the piston crown splashes onto the connecting rod eye of the connecting rod. Since the connecting rod eye is disposed about the piston pin, the oil wicks into the connecting rod eye bearing area defined between the piston pin and the connecting rod eye to provide lubrication. While the splash method does supply lubricant to the piston pin area, the amount of lubricant supplied to the piston pin by the splash method may not be satisfactory. Further, the splash method is a passive rather than an active or positive method of providing lubrication to the piston pin and thus is not preferable.

It is also known to supply lubricant to the piston pin via a bore drilled longitudinally through a corresponding connecting rod. The connecting rod bore is in fluid communication with a lubricant supply via the crankshaft. In this manner, pressurized lubricant may be provided to the piston pin such that this is a positive method of lubrication. However, the structural integrity of the connecting rod is compromised by the connecting rod bore itself. Alternatively, if the connecting rod is enlarged to compensate for the rod bore, thereby preserving the structural integrity of the connecting rod, weight and size for example, then become of particular concern. Thus, providing a connecting rod bore for supplying lubricant to the piston pin is not preferable. Additionally, this method is prone to unacceptable oil leakage from the bearing on the crankshaft.

The present invention is directed to overcoming one or more of the problems as set forth above.

DISCLOSURE OF THE INVENTION

In one aspect of the invention, an internal combustion engine comprises a housing including a combustion cylinder, a piston including a piston skirt reciprocally disposed within the combustion cylinder and having a piston pin, the piston skirt defining a bottom surface and having a lubrication passage therein, the lubrication passage having an inlet in the bottom surface of the piston skirt and an outlet adjacent the piston pin, a connecting rod including an eye pivotally disposed about the piston pin, the eye having a lubrication bore oriented to provide at least intermittent fluid communication between the piston pin and the outlet of the lubrication passage, and a lubrication applicator adapted to apply lubricant to the inlet of the lubrication passage.

In another aspect of the invention, an internal combustion engine comprises a housing including a combustion cylinder, a piston reciprocally disposed in the combustion cylinder, the piston having a piston skirt defining a bottom end, a piston pin, and a lubrication passage, the lubrication passage having an inlet port at the bottom end of the piston skirt and an outlet port adjacent the piston pin, a bushing disposed about the piston pin, a connecting rod including an eye pivotally disposed about the bushing, the eye having a fluid feed bore providing communication between an outer surface of the eye and an inner surface of the eye, the fluid feed bore in at least intermittent communication with the outlet port of the lubrication passage during piston reciprocation, and a nozzle assembly in fluid communication with an oil gallery and adapted to apply oil to the inlet port of the piston head during piston reciprocation.

In yet another aspect of the invention, a method of lubricating a piston pin of an internal combustion engine having a housing, a combustion cylinder, a piston reciprocally disposed in the combustion chamber and having a piston skirt defining a bottom side and piston pin, and a connecting rod with an eye pivotally radially disposed about the piston pin comprises the steps of, providing a fluid bore in the eye, the fluid bore in communication between the piston pin on an inside surface of the eye and an outside surface of the eye, providing a lubrication passage in the piston skirt, the lubrication passage having an inlet port in the bottom side of the piston skirt and an outlet port adjacent the fluid bore in the eye, providing a lubrication applicator in fluid communication with a lubricant supply, and applying the lubricant via the lubrication applicator to the inlet port of the piston skirt during piston reciprocation, wherein the lubricant is caused to flow from the inlet port into the lubrication passage, out of the outlet port into the fluid bore and onto the outer surface of the piston pin.

BEST MODE FOR CARRYING OUT THE INVENTION

Figure 1:
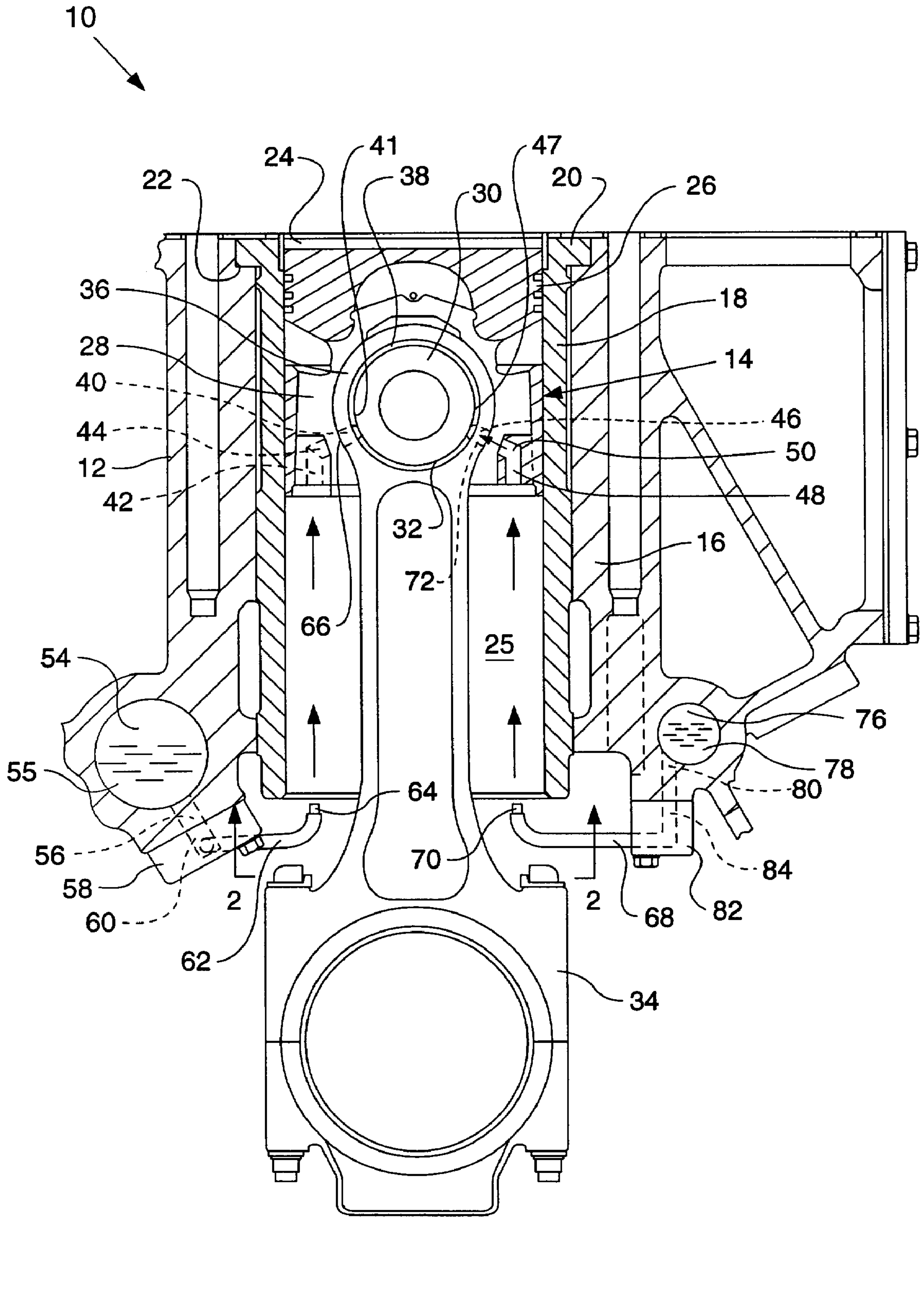
FIG. 1 is a simplified side, sectional view of a portion of an internal combustion engine showing a combustion chamber, piston, and connecting rod with an embodiment of the present piston pin lubrication system.

Referring now to the drawings, and more particularly to FIG. 1, there is shown a simplified side, sectional view of an embodiment of a portion of an internal combustion engine 10 including a housing 12 and a piston 14.

Housing 12 includes piston/combustion cylinder 16 in which is disposed cylinder liner 18. Cylinder liner 18 includes top flange 20 that seats upon ledge 22 of piston/combustion cylinder 16. Such configuration is deemed a top-mount type. Defined interior of cylinder liner 18 is combustion chamber 24.

Housing 12 also includes a combustion air inlet (not shown), an air scavenging channel (not shown), and an exhaust outlet (not shown) that are disposed in communication with combustion chamber 24. As is typical, combustion air is transported through the combustion air inlet and the air scavenging channel into combustion chamber 24 when piston 14 is at or near a BDC (Bottom Dead Center) position. An appropriate fuel, such as a selected grade of diesel fuel, is injected into combustion chamber 24 as piston 14 moves toward a TDC (Top Dead Center) position, as depicted in FIG. 1, using a controllable fuel injector system (not shown).

Piston 14 is reciprocally disposed within piston cylinder 16 defining combustion chamber 24 and lower cylinder chamber 25, and includes crown 26 disposed on top of or axially above skirt 28. Piston 14 also includes piston pin 30 disposed generally transverse to the axis thereof, about which is disposed bushing 32. Bushing 32 preferably includes external surface grooving such as T-grooves (not shown). Press fitted about bushing 32 is eye 36 of connecting rod 34 forming an eye bearing for piston pin 30. The inner diameter of bushing 32 is sized relative the outer diameter of piston pin 30 such that annular space 38 is defined therebetween.

Eye 36 is generally annular-shaped and includes bore 40 on an arcuate portion thereof that provides communication between inner and outer surfaces of eye 36. Bore 40 is of sufficient diameter to allow lubricant to pass from the radial outside of eye 36 and through bushing bore 41 to the inner diameter of bushing 32 while at the same time being of a diameter so as to not compromise the structural integrity of eye 36. Piston skirt 28 further includes passage/bore 44 having outlet port 66 adjacent the outer surface of eye 36 and inlet port or deflector 42 in skirt 52 and thus disposed on a lower or bottom surface of piston head 28. Passage 44 is of sufficient diameter to allow lubricant to pass from inlet port 42 to outlet port 66 while not appreciably affecting the structural integrity of piston skirt 28. In a preferred embodiment, but as well exemplary, inlet port or deflector 42 is elliptical and has an approximately fifteen millimeter (15 mm) inner diameter (ID). As well, passage 44 and/or outlet port 66 may be elliptical and have an approximately fifteen millimeter (15 mm) inner diameter (ID).

Figure 2:
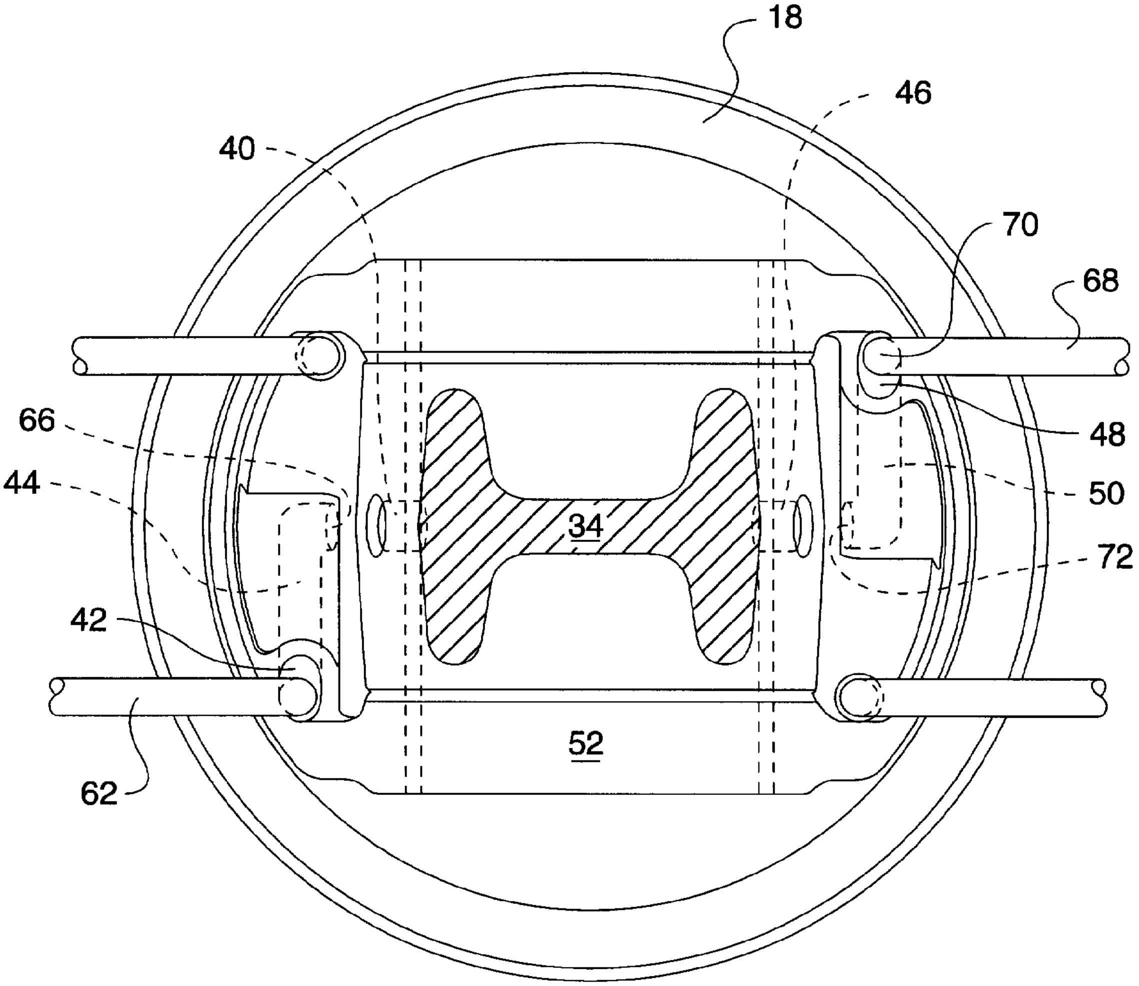
FIG. 2 is a simplified bottom, underside projection view of a combustion chamber and piston with the embodiment of the present piston pin lubrication system.

With additional reference to FIG. 2, it can be seen that passage 44 is skewed or angled relative to its inlet port 42 and its outlet port 66. In a preferred form, passage 44 is angled 30°, however, an angle of 20° through 90° may be used. Outlet port 66 is shown and is preferably disposed along a middle or center line of piston skirt 28 while inlet port 42 is depicted on one side of piston skirt 28. It should be understood that inlet port 42 may be disposed at various positions in skirt 52. The angle of passage 44 may affect the exact placement of inlet port 42 and outlet port 66.

Returning to FIG. 1, eye 36 further includes bore 46 on another arcuate portion thereof that provides communication between the inner and outer surfaces of eye 36, and bushing bore 47 provides further fluid communication with the inner diameter of bushing 32. Inlet bore 46 is of sufficient diameter to allow lubricant to pass from the radial outside of eye 36 to the radial inside of eye 36 into the eye bearing area while at the same time being of a diameter so as to not compromise the structural integrity of eye 36. Piston skirt 28 further includes passage/bore 50 having outlet port 72 adjacent the outer surface of eye 36 and inlet port or deflector 48 in skirt 28 and thus disposed on a lower or bottom surface of piston skirt 28. Passage 50 is of sufficient diameter to allow lubricant to pass from inlet port 48 to outlet port 72 while not appreciably affecting the structural integrity of piston skirt 28. In a preferred embodiment, but as well exemplary, inlet port or deflector 48 is elliptical and has an approximately fifteen millimeter (15 mm) inner diameter (ID). As well, passage 50 and/or outlet port 72 may be elliptical and have an approximately fifteen millimeter (15 mm) inner diameter (ID).

With additional reference again to FIG. 2, it can be seen that passage 50 is skewed or angled relative to its inlet port 48 and its outlet port 72. In a preferred form, passage 50 is angled 30° however, an angle of 20° through 90° may be used. Outlet port 72 is shown and is preferably disposed along a middle line of piston skirt 28 while inlet port 48 is depicted on one side of piston skirt 28. It should be understood that inlet port 48 may be disposed at various positions in skirt 52. The angle of passage 50 may affect the exact placement of inlet port 48 and outlet port 72.

While two passages 44 and 50 with corresponding inlet and outlet ports 42, 66 and 48, 72 respectively, are shown, it should be understood that only one such passage is sufficient to carry out the present invention, but that two or more passages may be utilized. Likewise, while two bores 40 and 46 are depicted in eye 36, is should be understood that only one bore is sufficient to carry out the present invention in cooperation with one passage of the piston skirt, but that two or more bores in corresponding cooperation with passages in the piston skirt may be utilized.

With reference back to FIG. 1, engine 10 further includes main lubricant gallery 54 that holds lubricant 55 that is usually oil. Main lubricant gallery 54 is in fluid communication with bore or passage 56 that is in fluid communication with bore or passage 60 in distribution block, head, or cover 58. Extending from block 58 is conduit, tube or rod 62 that is in fluid communication with bore 60 on one end and which terminates in orifice, nozzle, or jet 64 on another end. In one form, jet 64 has been produced having a 3.1 mm ID and operable at 60 psi, with a maximum velocity $V_P$ of 22 m/s (meters per second) Tube 62 is positioned such that jet 64 may direct a spray axially upward, relative to piston reciprocation, into cylinder chamber 25. Cylinder chamber 25 may be considered as the interior portion of the cylinder axially below piston 14. In accordance with this definition and of combustion chamber 24, it is evident that without piston 14, combustion chamber 24 and cylinder chamber 25 are one in the same and/or undefinable. Further, both combustion chamber 24 and cylinder chamber 25 have variable volumes depending on the position of piston 14. As the volume of combustion chamber 24 increases, the volume of cylinder chamber 25 decreases and vice versa.

It is preferred that jet 64 is positioned co-axially below inlet port 42 such that lubricant/oil liberated from jet 64 is directed generally co-axially into inlet port 42. Of course, it should be evident that as piston 14 reciprocates within combustion cylinder 16 the amount of oil entering inlet port 42 is greatest when piston 14 is in a lowermost position of reciprocation or travel, otherwise known as Bottom Dead Center (BDC). The least amount of oil will be delivered to inlet port 42 when piston 14 is in an uppermost position of reciprocation or travel, otherwise known as Top Dead Center (TDC), as depicted in FIG. 1.

Since lubricant within lubricant gallery 54 is under pressure during engine operation, tube 62 delivers lubricant to jet 64 continuously to transfer the lubricant to the underside of piston 14. Of course, the jet may be of a controllable type either manually or automatically to allow intermittent or regulated lubricant application. As the lubricant is liberated from jet 64 the lubricant is ejected axially upwardly into inlet port 42 and is directed/forced through passage 44 towards outlet port 66. Since eye 36 pivots or limitedly rotates about pivot pin 30 and bushing 32 during piston reciprocation, bore 40 is preferably positioned on eye 36 such that it is in full fluid communication with outlet port 66 generally during BDC and thus in full fluid communication with outlet port 66 generally during TDC as well. During piston reciprocation between BDC and TDC, and TDC and BDC, bore 40 is in partial fluid communication with outlet port 66. The degree or extent of fluid communication between outlet port 66 and bore 40 during pivoting of eye 36 is a function of the diameter and/or shape of outlet port 66 and bore 40. While bore 40 may be positioned on eye 36 such that it is in full fluid communication with outlet port 66 during piston positions other than TDC or BDC, having bore 40 in full fluid communication with outlet port 66 during at least BDC allows a maximum amount of lubricant to reach piston pin 30 since inlet port 42 is closest to jet 64 during BDC. Further, since connecting rod 34 is not loaded as much as it is during TDC, the oil may flow around bushing 32 and piston pin 30.

Referring particularly to FIG. 1, engine 10 may further include tube or conduit 68 that is in fluid communication with lubricant gallery 76 and includes orifice, nozzle, or jet 70. Lubricant gallery 76 retains lubricant/oil 78 therein. Attached to housing 12 proximate lubricant gallery 76 is tube block 82. Bore 80 within housing 12 is in fluid communication with lubricant gallery 76 on one end, and in fluid communication with bore 84 of tube block 82 on another end. Bore 84 is thus in fluid communication with tube 68. Tube 68 is situated such that jet 70 is positioned generally co-axially below inlet port 48. In this manner, lubricant is coaxially sprayed into inlet port 48 during piston reciprocation for piston pin lubrication in the same manner as that described with respect to jet 64 and inlet port 42. More particularly, since passage 50, and corresponding inlet and outlet ports 48 and 72 of piston skirt 28, and bore 46 of eye 36 are identical to passage 44, and corresponding inlet and outlet ports 42 and 66 of piston skirt 28, and bore 40 of eye 36, passage 50 and corresponding inlet and outlet ports 48 and 72, and bore 46 function in the same manner as passage 44 and corresponding inlet and outlet ports 42 and 66, and bore 40.

Of course, in a multi-piston engine such as a V-16, each piston and connecting arm could include the present arrangement along with lubricant applicators, or any number depending on the desired result.

INDUSTRIAL APPLICABILITY

During operation of internal combustion engine 10, piston 14 (and all pistons therein) is caused to reciprocate, or travel up and down, within cylinder 16 through continuous intermittent combustion. Oil 55 from oil gallery 54 is under pressure and thus caused to flow into tube 62 via bores or conduits 56 and 60. Tube 62 includes nozzle 64 that is positioned relative to cylinder 16 and piston 14 to liberate oil in an axially upward direction towards piston skirt 28.

Inlet port 42 in piston skirt 28 is in fluid communication with bore 40 in eye 36 via lubrication passage 44 and outlet port 66 machined into piston skirt 28 peripheral to eye bearing cavity 74. Bore 40 provides fluid communication to bushing 32 and/or piston pin 30. Liquid entering inlet port 42 can thus flow to bushing 32 and/or piston pin 30.

Preferably, nozzle 64 is positioned co-axial with inlet port 42 and in closest proximity thereto during BDC of piston 14. Thus, during piston reciprocation nozzle 64 is liberating oil axially upwardly towards inlet port 42. The oil thus flows from inlet port 42 to piston pin 30.

Dual lubrication systems may be provided as depicted in FIG. 1 with the addition of another lubrication applicator including tube 68 and nozzle 70 with nozzle 70 positioned to liberate oil axially upwardly toward piston skirt 28. Piston skirt 28 further includes inlet port 48 disposed preferably co-axially above nozzle 70 providing fluid communication to bushing 32 and/or piston pin 30 via passage 50 and outlet port 72 in fluid communication with bore 46 in eye 36.

During operation of engine 10 and thus piston reciprocation, oil is presented to bushing 32 and/or piston pin 30 from nozzle 70 through inlet port 48, passage 50, outlet port 72, and bore 46.

The present invention provides positive lubrication of the piston pin during the entire stroke length of the piston.

Other aspects, objects and advantages of this invention can be obtained from a study of the drawings, the disclosure and the appended claims.

What is claimed is:

1. An internal combustion engine comprising:

a housing including a combustion cylinder;

a piston including a piston skirt reciprocally disposed within said combustion cylinder and having a piston pin, said piston skirt defining a bottom surface and having a lubrication passage therein, said lubrication passage having an inlet in said bottom surface of said piston skirt and an outlet adjacent said piston pin;

a connecting rod including an eye pivotally disposed about said piston pin, said eye having a lubrication bore oriented to provide at least intermittent fluid communication between said piston pin and said outlet of said lubrication passage, said lubrication bore of said eye being oriented such that said lubrication bore is coaxial with said outlet of said lubrication passage of said piston skirt at least when said piston is proximate a bottom dead center position; and a lubrication applicator adapted to apply lubricant to said inlet of said lubrication passage.

2. The internal combustion engine of claim 1, wherein said lubrication bore of said eye is oriented such that said lubrication bore is coaxial with said outlet of said lubrication passage of said piston skirt when said piston is proximate a top dead center position and proximate a bottom dead center position.

3. The internal combustion engine of claim 1, wherein said lubrication applicator comprises a spray nozzle.

4. The internal combustion engine of claim 1, wherein said lubrication applicator is adapted to apply lubricant in an axial direction relative to piston reciprocation.

5. An internal combustion engine comprising:

a housing including a combustion cylinder;

a piston including a piston skirt reciprocally disposed within said combustion cylinder and having a piston pin, said piston skirt defining a bottom surface and having a lubrication passage therein, said lubrication passage having an inlet in said bottom surface of said piston skirt and an outlet adjacent said piston pin;

a connecting rod including an eye pivotally disposed about said piston pin, said eye having a lubrication bore oriented to provide at least intermittent fluid communication between said piston pin and said outlet of said lubrication passage; and a lubrication applicator adapted to apply lubricant to said inlet of said lubrication passage, said lubrication applicator being adapted to continuously apply oil during piston reciprocation from an oil gallery within said housing.

6. An internal combustion engine comprising:

a housing including a combustion cylinder;

a piston including a piston skirt reciprocally disposed within said combustion cylinder and having a piston pin, said piston skirt defining a bottom surface and having a lubrication passage therein, said lubrication passage having an inlet in said bottom surface of said piston skirt and an outlet adjacent said piston pin, said lubrication passage comprising a first branch axially extending from said inlet, and a second branch extending from said first branch to said outlet;

a connecting rod including an eye pivotally disposed about said piston pin, said eye having a lubrication bore oriented to provide at least intermittent fluid communication between said piston pin and said outlet of said lubrication passage; and a lubrication applicator adapted to apply lubricant to said inlet of said lubrication passage.

7. The internal combustion engine of claim 6, wherein said second branch is oriented at approximately a 45° angle between said first branch and said outlet.

8. An internal combustion engine comprising:

a housing including a combustion cylinder;

a piston reciprocally disposed in said combustion cylinder, said piston having a piston skirt defining a bottom end, a piston pin, and a lubrication passage, said lubrication passage having an inlet port at said bottom end of said piston skirt and an outlet port adjacent said piston pin;

a bushing disposed about said piston pin and including a bushing bore;

a pivoting connecting rod including an eye disposed about said bushing, said eye having a fluid feed bore in fluid communication with said bushing bore and providing communication between an outer surface of said eye and an inner surface of said eye, said fluid feed bore in at least intermittent communication with said outlet port of said lubrication passage during piston reciprocation; and a nozzle assembly in fluid communication with an oil gallery and adapted to apply oil to said inlet port of said piston skirt during piston reciprocation.

9. A method of lubricating a piston pin of an internal combustion engine having a housing, a combustion cylinder, a piston reciprocally disposed in the combustion chamber and having a piston skirt defining a bottom side and piston pin, and a connecting rod with an eye pivotally radially disposed about the piston pin, the method comprising the steps of:

providing a fluid bore in the eye, the fluid bore in communication between the piston pin on an inside surface of the eye and an outside surface of the eye;

providing a lubrication passage in the piston skirt, the lubrication passage having an inlet port in the bottom side of the piston skirt and an outlet port adjacent the fluid bore in the eye, the fluid bore and the lubrication passage being oriented to provide full communication between the fluid bore and the lubrication passage at least when the piston is proximate a bottom dead center position during piston reciprocation;

providing a lubrication applicator in fluid communication with a lubricant supply; and applying lubricant via the lubrication applicator to the inlet port of the piston skirt during piston reciprocation, wherein the lubricant is caused to flow from the inlet port into the lubrication passage, out of the outlet port into the fluid bore and onto the outer surface of the piston pin.

10. The method of claim 9, wherein the lubricant is oil and is applied continuously during piston reciprocation.

11. The method of claim 9, wherein the fluid bore and the lubrication passage are oriented to provide full communication between the fluid bore and the lubrication passage when the piston is proximate a top dead center and a bottom dead center position during piston reciprocation.

12. The method of claim 9, wherein the lubrication applicator comprises a spray nozzle and the lubricant is applied at generally 60 psi.

13. An internal combustion engine comprising:

a housing including a combustion cylinder;

a piston reciprocally disposed in said combustion cylinder, said piston having a piston skirt defining a bottom end, a piston pin, and a first lubrication passage, said first lubrication passage having a first inlet port at said bottom end of said piston skirt and a first outlet port adjacent said piston pin, said piston skirt further including a second lubrication passage defining a second inlet port in said bottom side of said piston skirt and a second outlet port adjacent said piston pin;

a bushing disposed about said piston pin and including a first bushing bore and a second bushing bore;

a pivoting connecting rod including an eye disposed about said bushing, said eye having a first fluid feed bore in fluid communication with said first bushing bore and providing communication between an outer surface of said eye and an inner surface of said eye, said first fluid feed bore in at least intermittent communication with said first outlet port of said first lubrication passage during piston reciprocation, said connecting rod further including a second fluid bore in fluid communication with said second bushing bore and providing communication between the outer surface of said eye and the inner surface of said eye and in at least intermittent communication with said second outlet port of said second lubrication passage during piston reciprocation;

a first nozzle assembly in fluid communication with an oil gallery and adapted to apply oil to said inlet port of said piston skirt during piston reciprocation; and a second nozzle assembly in fluid communication with an oil gallery and adapted to apply oil to said second inlet port of said piston skirt during piston reciprocation.

14. The internal combustion engine of claim 13, wherein said lubrication passages are disposed opposite each other about said piston skirt, said fluid bores and said bushing bores are disposed opposite each other about said eye, and said nozzle assemblies are oriented to spray oil into corresponding inlet ports during piston reciprocation.

15. The internal combustion engine of claim 13, wherein said fluid bores of said eye are oriented to be coaxial with corresponding said outlet ports of said lubrication passages of said piston skirt when said piston is proximate a top dead center position and proximate a bottom dead center position.

16. The internal combustion engine of claim 13, wherein said nozzle assemblies are adapted to continuously apply oil during piston reciprocation.

17. The internal combustion engine of claim 13, wherein said nozzle assemblies are adapted to apply oil in an axial direction relative to piston reciprocation to corresponding inlet ports.

18. The internal combustion engine of claim 13, wherein said lubrication passage comprises a first branch axially extending from said inlet port, and a second branch extending from said first branch to said outlet port, and said second lubrication passage comprises a third branch axially extending from said second inlet port, and a fourth branch extending from said third branch to said second outlet port.

19. The internal combustion engine of claim 18, wherein said second branch is oriented at approximately a 45° angle between said first branch and said outlet port, and said fourth branch is oriented at approximately a 45° angle between said third branch and said second outlet port.

* * * * *